W. E. FOWLER, Jr.
BRAKE BEAM.
APPLICATION FILED JUNE 25, 1913.
1,080,510.
Patented Dec. 2, 1913.
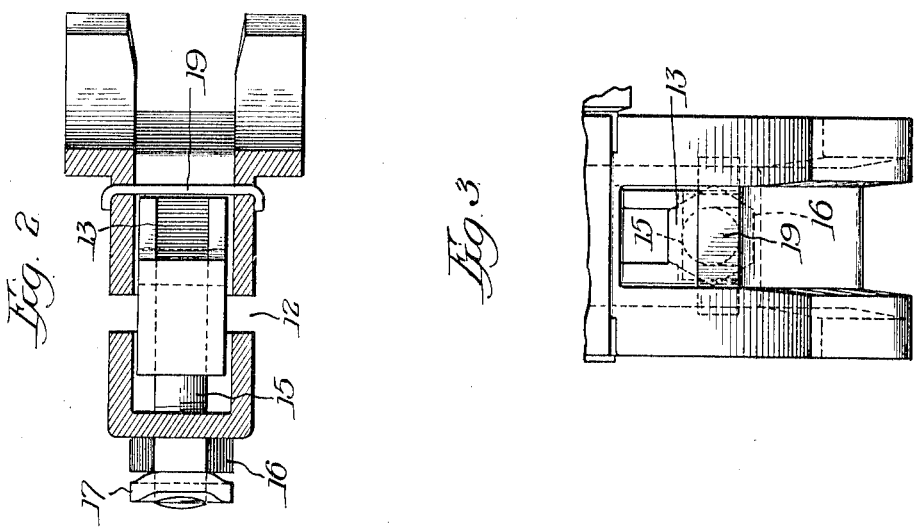
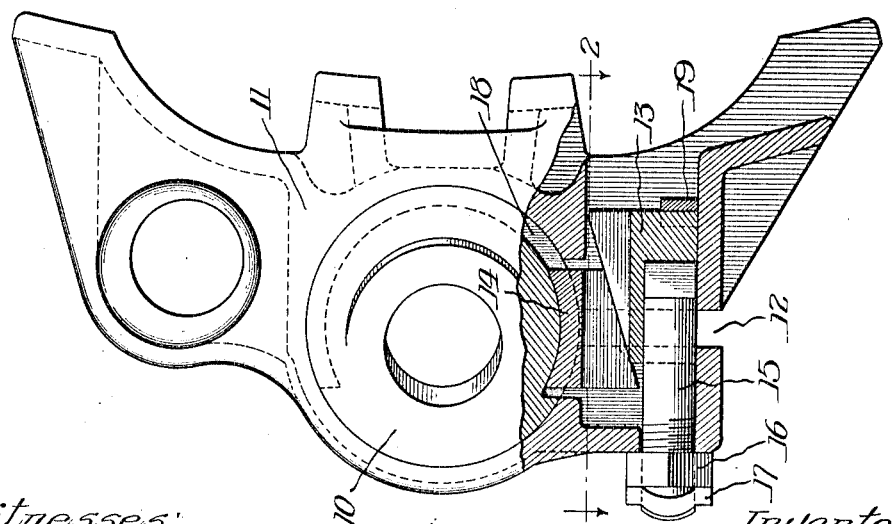

UNITED STATES PATENT OFFICE.

WILLIAM E. FOWLER, JR., OF HAMMOND, INDIANA, ASSIGNOR TO SIMPLEX RAILWAY APPLIANCE COMPANY, OF CHICAGO, ILLINOIS, A CORPORATION OF DELAWARE.

BRAKE-BEAM.

1,080,510.  Specification of Letters Patent.  Patented Dec. 2, 1913.

Application filed June 25, 1913.   Serial No. 775,829.

*To all whom it may concern:*

Be it known that I, WILLIAM E. FOWLER, Jr., a citizen of the United States, and residing at Hammond, in the county of Lake and State of Indiana, have invented certain new and useful Improvements in Brake-Beams, of which the following is a specification.

My invention relates to railway brake beams and has particular reference to a novel adjustable head for use in connection therewith.

It is considered desirable by many railroads to employ, at least in connection with passenger service, a brake head which may be rotated or adjusted on the end of the beam and which may be secured in the adjusted position. Many forms of such adjustable heads have been proposed an object being to secure maximum holding power with simplicity. It is desirable also that the head should be held in such manner as to prevent its removal by some means which prevents its rotation on the sleeve.

The construction of brake head herein shown was first disclosed in Patent No. 990,855, issued May 2, 1911. In practice this head has been found to be very efficient at all times. It has been found desirable, however, to employ means whereby the brake head can not be removed from the beam by the loosening of the locking nuts which hold the parts in adjusted position. In the present instance this means comprises a simple key extended transversely of the head, this key being placed in position after the head is placed on the end of the beam.

My invention will be more readily understood by reference to the accompanying drawings, wherein, Figure 1 is a side elevation of a brake head constructed in accordance with my invention, the lower portion of the head being broken away showing the operating parts; Fig. 2 is a section on the line 2—2 of Fig. 1, and, Fig. 3 is a fragmentary front elevation of the construction of Fig. 1.

Referring more particularly to the drawings it will be seen that on a sleeve 10, is mounted the brake head 11, which head is split at 12, the arrangement being such that the head is clamped upon the sleeve 10. The clamping mechanism comprises a block 13, having an inclined surface, which block coöperates with a second block having an oppositely inclined coöperating surface, the block 13 being actuated by a bolt 15, the parts being held in adjusted position by the nut 16, and lock nut 17. The block 14, coöperates with the sleeve 10 and seats within a groove 18, therein. It will be seen that when the block 14 is held in raised position that the head cannot be slipped off from the sleeve 10. Furthermore, that by the wedge action of the blocks the block 14 is forced securely against the sleeve, the force which is applied to the block being also used to clamp the head upon the sleeve.

It will be seen that should the nuts 16, 17, become disengaged, that the blocks 13, 14, will be displaced, allowing the block 14 to descend to an extent whereby it is out of engagement with the groove in the sleeve. At this point the head may be disengaged from the beam with disastrous results. To obviate this possibility I provide a key 19, extended transversely of the head, which key is inserted in front of the block 13, after the blocks 13, 14 are placed, the end of the key then being bent to hold it in place. By this means the head can never be removed from the end of the beam without first removing the key 19, and inasmuch as there is no wear on the key when in service, the safety of the head is assured.

I claim:

1. In a brake beam, the combination of a sleeve having a peripheral groove, a brake head, a block in the lower portion of said head, said block being adapted to be seated in said groove, and a key extended through the brake head and preventing the removal of the block and consequent disengagement of the head from the sleeve, substantially as described.

2. In a brake beam, the combination of a sleeve having a peripheral groove, a clamping break head, a pair of wedge blocks mounted in a recess within said head, one of said blocks being adapted to be projected into the groove in said sleeve, and a key mounted in said head and adapted to prevent the removal of said wedge blocks and the consequent disengagement of said head from said sleeve, substantially as described.

3. In a brake beam, the combination of a sleeve having a peripheral groove, a clamping brake head, said head being provided with a recess in its lower portion, wedge blocks mounted in said recess, one of said
5 blocks being adapted to be projected into the groove in said sleeve, and a key extending transversely of the head and barring the removal of said wedge blocks, substantially as described.

WILLIAM E. FOWLER, Jr.

Witnesses:
  JOHN W. MORTHLAND,
  AUDREN S. BURHEYN.